United States Patent Office 3,640,883
Patented Feb. 8, 1972

3,640,883
SKIN PROTECTIVE WASHING AND CLEANSING COMPOSITIONS
Ernst Gotte, Ratingen-Tiefenbroich, Germany, assignor to Henkel & Cie GmbH, Dusseldorf-Holthausen, Germany
No Drawing. Filed Nov. 14, 1968, Ser. No. 775,921
Claims priority, application Germany, Dec. 14, 1967, H 64,776
Int. Cl. C11d 1/18, 1/38, 1/50
U.S. Cl. 252—545  4 Claims

ABSTRACT OF THE DISCLOSURE

Washing and cleansing compositions having a content of anionic surface-active agents and an effective amount of a skin protective polyamide having free amino groups, said polyamide being present in a form selected from the group consisting of the water-dispersible free amino group containing polyamides and water-soluble acid addition salts thereof and being the condensation product of 1 mol of an organic dicarboxylic acid having from 2 to 10 carbon atoms and free of other amine reacting substituents, and from 1 to 2 mols of a polyalkyleneamine of the formula

wherein $n$ represents an integer from 2 to 6 and $m$ represents an integer from 1 to 10.

THE PRIOR ART

It is known that surface-active compounds containing sulfonate and sulfate groups are more or less inclined to form salt-like linkages with the epidermis of the human skin. Owing to this, the outer layers of the epidermis lose their elasticity, become cracked and prematurely rubbed off, which causes a stickiness, stretched or burning sensation in the skin of the persons effected and leads to considerable itching.

These drawbacks of the anionic surface-active compounds can be lessened to a certain extent by addition of soluble proteins or protein degradation products. The proteins, however, are biologically quickly decomposed, so that their practical use is narrowly restricted. Further, alkylamineoxides have been used for the same purpose, but these themselves are relatively aggressive to the skin and, therefore, not suitable for all purposes.

OBJECTS OF THE INVENTION

An object of the present invention is the development of washing and cleansing compositions containing anionic surface active agents and a content of a skin protective polyamide compound.

Another object of the present invention is the obtention of washing and cleansing compositions having a content of anionic surface-active agents and an effective amount of a skin protective polyamide having free amino groups, said polyamide being present in a form selected from the group consisting of the water-dispersible free amino group containing polyamides and water-soluble acid addition salts thereof and being the condensation product of 1 mol of an organic dicarboxylic acid having from 2 to 10 carbon atoms and free of other amine reacting substituents, and from 1 to 2 mols of a polyalkyleneamine of the formula

wherein $n$ represents an integer from 2 to 6 and $m$ represents an integer from 1 to 10.

These and other objects of the invention will become more apparent as the description thereof proceeds.

DESCRIPTION OF THE INVENTION

It has now been discovered that the skin irritation of washing and cleansing agents containing anionic surface-active agents can be decreased or eliminated by a content of certain polyamides. More particularly, according to the present invention, there is provided washing and cleansing compositions having a content of anionic surface-active agents and an effective amount of a skin protective polyamide having free amino groups, said polyamide being present in a form selected from the group consisting of the water-dispersible free amino group containing polyamides and water-soluble acid addition salts thereof and being the condensation product of 1 mol of an organic dicarboxylic acid having from 2 to 10 carbon atoms and free of other amine reacting substituents, and from 1 to 2 mols of a polyalkyleneamine of the formula

wherein $n$ represents an integer from 2 to 6 and $m$ represents an integer from 1 to 10.

The polyamides are preferably present in the form of their water-soluble acid addition salts, for example, salts with organic carboxylic acids such as the alkanoates, i.e., the acetates, salts with mineral acids such as the chlorides, bromides, sulfates or salts with organic acid sulfates such as the alkylsulfates.

The preparation of the polyamides to be used according to the invention is effected in known way by reacting the organic dicarboxylic acid or its functional derivatives such as the anhydrides, halides, esters or amides, with the polyalkyleneamines in the presence or absence of solvents. Suitable organic dicarboxylic acids are alkanedioic acids such as oxalic, malonic, succinic, glutaric, adipic, pimelic, suberic and sebacic acids. Furthermore, unsaturated dicarboxylic acids or alkenedioic acids such as maleic or fumaric acids, or hydroxydicarboxylic acids (hydroxyalkanedioic acids) such as malic acid, and cyclic dicarboxylic acids, for example, cycloalkanedioic acids such as cyclohexane-1,4-dicarboxylic acid and benzene dicarboxylic acids such as terephthalic acid may also be used as starting substances.

Suitable polyalkyleneamines are, for example, diethylenetriamine, triethylenetetramine, tetraethylenepentamine and their higher homologues, and also dipropylenediamine, tripropylenetetramine, and polyalkylenepolyamines, the alkylene residues of which contain up to 6 carbon atoms. The alkylene residues may be straight-chain, branched-chain, or cycloalkane, as in the case of the dicyclohexylenetriamine.

By the choice of the molar ratio of dicarboxylic acids to polyalkyleneamine within a range from 1:1 to 1:2, preferably 1:1 to 1:1.5, the degree of polymerization can be varied. Within the preferred range the skin-protecting action is largely independent of the molar ratio and, therefore, also of the average degree of polymerization.

The polyamides to be used according to the invention are insoluble in water, and readily soluble in dilute inorganic or organic acids such as hydrochloric acid, hydrobromic acid, sulfuric acid, alkylsulfuric acid, formic acid or acetic acid. These solutions may give turbidities or precipitates with anionic surface-active compounds, which dissolve again in an excess of one of the two components. The polyamides can also be dispersed or dissolved in solutions of surface-active compounds without first being converted into the salt form.

The polyamides to be used according to the invention may further contain minor amounts of low molecular weight amides or unreacted starting substances, which may be removed by extraction with organic solvents and if desired returned to the reaction. Since these compounds are not detrimental to the properties of the washing and cleaning agents, however, a separation is not generally necessary.

The polyamides or their water-soluble salts may be added to any washing and cleaning agent, whatever its composition, which contains anionic detergent substances. Examples of such anionic detergent substances are olefinsulfonates, such as are obtained, for example, by sulfonation of primary or secondary aliphatic mono-olefins with gaseous $SO_3$ and subsequent alkaline or acid hydrolysis, and also alkylbenzenesulfonates, alkylsulfonates and $\alpha$-sulfo-fatty acid esters, primary and secondary alkyl sulfates, and the sulfates of ethoxylated or propoxylated fatty alcohols. Further compounds of this class, which may possibly be present in the washing agents, are the higher molecular weight sulfated partial ethers and partial esters of polyhydric alcohols, such as the alkali metal salts of the monoalkylethers or the mono-fatty acid esters of glycerine monosulfuric acid ester or of 1,2-dihydroxypropanesulfonic acid. Further, the sulfates of ethoxylated or propoxylated fatty acid amides and alkylphenols and fatty acid taurides and fatty acid isothionates are suitable.

Besides the said anionic surface-active compounds of the sulfonate and sulfate types given above, which are the most aggressive against the skin, the washing agents may contain alkali metal soaps of fatty acids, ampholytes such as alkylbetaines and alkylsulfobetaines, and also nonionic detergent substances such as alkyl and acyl polyglycol ethers, alkylphenol polyglycol ethers, mixed condensates from polyethylene glycol and polypropylene glycol, and polyglycol ether derivatives of alkylamines and fatty acid alkanolamides. The said detergent substances may also be present in admixture in the washing and cleansing agents.

If the said detergent compounds contain an aliphatic hydrocarbon residue, this should preferably be a straight chain and have 8 to 22 carbon atoms. In the compounds with araliphatic hydrocarbon residues, the preferably unbranched alkyl chains contain an average of 6 to 16 carbon atoms.

The washing and cleansing agents may also contain further customary components according to the purpose for which they are to be used, such as pyrophosphates, polyphosphates and higher molecular weight condensed phosphates, and silicates, in the form of their alkali metal salts, oxygen-yielding or active chlorine containing bleaching agents such as alkali metal perborates, alkali metal percarbonates, alkali metal hypochlorites, chlorinated cyanuric acids and their alkali metal salts, stabilizers such as magnesium silicate, and neutral salts such as sodium sulfate. Further, sequestering agents may also be present, especially alkali metal salts of aminopolycarboxylic acids, for example, the sodium salts of aminotriacetic acid or ethylenediaminetetraacetic acid, and also the alkali metal salts of hydroxyalkyldiphosphonic acids and aminopolyphosphonic acids, for example, the disodium salt of 1-hydroxyethane-1,1-diphosphonic acid and the hexasodium salt of aminotri-(methylenephosphonic acid). Moreover, foam stabilizing agents may be components of the mixture such as fatty acid mono- and di-alkylolamides, or foam-inhibiting substances, especially the reaction products of 1 mol of cyanuric chloride with 2 to 3 mols of primary or secondary amines with 4 to 20 carbon atoms, and also the usual greying inhibitors such as carboxymethyl cellulose, enzymes, dyestuffs and perfumes, optical brighteners, disinfectants and preservatives, as well as handle-improving means.

The washing and cleansing agents of the invention may be present in solid, i.e., in lumps or powder form, and as solutions or pastes. In addition to the aforementioned components, liquid preparations may also contain hydrotropic substances such as low molecular weight alkylbenzenesulfonates, urea and organic solvents. Moreover, abrasives consisting of mineral or synthetic resin granulates may be present in solid or liquid burnishing or scouring agents.

The washing and cleansing agents may contain from about 1% to 60%, preferably 3% to 30%, by weight of polyamides to be used according to the invention, based on the amount of surface-active sulfonate and sulfate raw materials. Larger amounts than 60% do not appreciably improve the skin-protective action, and smaller amounts than 1% only show a relatively small effect. The additives according to the invention possess valuable skin-protecting and skin-care properties and do not impair the cleansing power of the washing materials. They are, therefore, suitable both for body and hair washing agents and for inserting in fine and coarse washing agents for textiles, as additions to dish-washing agents as well as every kind of cleansing, scouring and burnishing agents.

The following specific embodiments are illustrative of the practice of the invention. They are not however, to be deemed limitative in any respect.

EXAMPLES

In the following examples the skin protective action was determined by the zein method.

The solubility of zein, a protein from the hull of the grains of maize, in solutions of surface-active compounds is a measure of their compatibility with the skin, since the dissolving power of a solution of surface-active compounds for zein and skin protein are parallel. The skin tolerance of n-dodecylbenzenesulfonate solutions with and without addition of the skin-protective substances according to the invention was determined by this method as described below.

40 ml. of a solution which contains 10 gm. per liter of the surface-active compound and having a neutral reaction for exact comparisons, are tempered in a 50 ml. narrow-necked flask in a water-bath at 35° C. 2 gm. of commercial zein of Eastman Organic Chemicals are added and the mixture is shaken vigorously by hand in order to prevent formation of lumps. The narrow-necked flask is then clamped in an air thermostat and allowed to rotate at 5 r.p.m. at 35° C. for an hour. A part of the solution is centrifuged and passed through a wide-pore filter. The clear, now more or less yellow-colored solution is tested for nitrogen content by the micro-Kjeldahl method. 1 ml. is decomposed by heating in a 100 ml. Kjeldahl flask with a little selenium reaction mixture and about 3 ml. of concentrated sulfuric acid until the liquid is clear. In a distillation apparatus, the solution is treated with an excess of a 20% sodium hydroxide solution and the ammonia formed is distilled into a receiver containing 10 ml. of $\frac{1}{20}$ N sulfuric acid. The unused sulfuric acid is back-titrated with $\frac{1}{20}$ N sodium hydroxide. A consumption of 1 ml. of $\frac{1}{20}$ N sulfuric acid corresponds to 70 mg. of nitrogen in 100 ml. of solution of surface-active compounds.

If the surface-active compound contains nitrogen, which is decomposed at the same time, this fraction must be ascertained and subtracted from the total amount. The zein value is indicated in mg. of N which are contained in 100 ml. of solution of surface-active compounds.

A zien value of 350 is taken as the limiting value for a good skin compatibility. In the following Table 1, the values are grouped together for pure n-dodecylbenzenesulfonate (Na salt).

TABLE 1

| Gms./liter of surface active compound | Zein value | Practical result on skin |
| --- | --- | --- |
| 10 | 650 | Incompatible. |
| 9 | 600 | Do. |
| 8 | 550 | Do. |
| 4.85 | 350 | Compatible. |

Examples 1 to 6 are grouped in the following Table 2. Moreover, two comparative experiments were added in which the added substances were used which are stated in the literature to be especially kind to the skin.

Further, the changes in the skin were observed in the case of 10 persons who immersed their hands daily for 5 minutes in a solution of 3 gm. per liter of surface-active compound. When a pure solution of surface-active compound was used, all the people noted a stickiness of the skin; on the second day, 7 people complained of considerable burning and a reddening of the skin, 2 people felt an itching. When the experiments were concluded after 2 days, scaling off of the skin occurred, especially between fingers and on the palm of the hand.

When 15% of one of the condensation products mentioned in Examples 1 to 6 was added to the solution of surface-active compound, no changes were noted in the first 3 days of the experiment. Only on the fourth day, a slight stickiness and reddening became noticeable with some people and with one person there was a slight burning of the skin.

For the preparation of the polyamides used in the examples, solutions of equimolecular amounts of dicarboxylic acids and polyamines in xylene were refluxed in a distillation apparatus with a trap for separation of the water formed in the reaction and return of the solvent, until water was no longer formed. The resin obtained after distilling off the xylene and drying in vacuum was dissolved in a 2% hydrochloric acid solution or in a 10% acetic acid solution, and the excess acid was neutralized with a sodium hydroxide solution.

TABLE 2

| | Addition of condensation products, in the form of chlorides (molar ratio 1=1) from— | Zein value— 8 g./l. (S), 2 g./l. of additive | The zein value was 350 at— | |
|---|---|---|---|---|
| | | | Highest amount of (S), g./l. | Lowest amount of additive, g./l. |
| Example 1 | Triethylenetetramine plus adipic acid | 332 | 8.1 | 1.9 |
| Example 2 | Diethylenetriamine plus adipic acid | 340 | 8.0 | 2.0 |
| Example 3 | Triethylenetetramine plus succinic acid | 350 | 7.9 | 2.1 |
| Example 4 | Diethylenetriamine plus succinic acid | 350 | 7.9 | 2.1 |
| Example 5 | Triethylenetetramine plus glutaric acid | 350 | 7.9 | 2.1 |
| Example 6 | Triethylenetetramine plus terephthalic acid | 345 | 8.0 | 2.0 |
| Comparison | Dodecyldimethylamineoxide | 490 | 6.3 | 3.7 |
| Do | Oleic acid amide of diethylenetriamine | 462 | 6.6 | 3.4 |

NOTE.—(S) represents the anionic surface-active compound Na-n-dodecylbenzenesulfonate.

Example 7

An aqueous rinsing agent, containing 12.5% by weight of a sec.-alkylsulfonate having a chain length of $C_{14}$–$C_{18}$, 12.5% by weight of a coconut fatty alcohol reacted with 2 mols of ethylene oxide and then sulfated (surface-active compounds as Na salts), with a concentration used of 0.5 gm./liter of surface-active compound, on repeated use as a dish-rinsing agent, caused skin irritation in the people used in the experiment. When, however, 1% by weight of a condensation product according to Example 1 was previously added in the form of the acetate, the skin irritation failed to appear without any reduction in the efficiency of the rinsing taking place.

Example 8

Example 7 was repeated with a rinsing agent which contained instead of the alkylsulfonate, the same quantity of n-dodecylbenzenesulfonate. The skin irritations ceased when the rinsing agent contained 2% by weight of a condensation product according to Example 1 in the form of the acetate.

Example 9

Pulverulent fine washing agents according to the following formulation showed no skin irritation when used in a concentration of 0.5 to 5 gm./liter:

5% to 50% by weight of an anionic washing material from the class of the dodecylbenzenesulfonates, olefinsulfonates, alkanesulfonates, fatty alcohol sulfates and alkylpolyglycol ether sulfates, and their mixtures;

0 to 25% by weight of a non-ionic washing material from the class of the ethoxylated and/or propoxylated fatty alcohols, alkylphenols, fatty acids and fatty acid amides, and their mixtures;

0 to 50% by weight of a complex-forming compound from the class of the di- or tri-phosphates, aminopolycarboxylic acids and aminopolyphosphonic acids in the form of their alkali metal or ammonium salts, and mixtures of the said compounds;

0 to 30% by weight of the usual added substances from the class of the percompounds, optical brighteners, dyestuffs and perfumes, celluloseglycollic acid salts and neutral salts;

1% to 5% by weight of a skin-protective substance according to Examples 1 to 6.

Example 10

Liquid rinsing and fine washing agents according to the following formulation showed no skin irritation when the concentration used was 0.5 to 5 gm./liter:

5% to 40% by weight of an anionic washing material from the class of the dodecylbenzenesulfonates, olefinsulfonates, alkanesulfonates, fatty alcohol sulfates and alkylpolyglycol ether sulfates, and their mixtures;

0 to 20% by weight of a non-ionic washing material from the class of the ethoxylated and/or propoxylated fatty alcohols, alkylphenols, fatty acids and fatty acid amides, and their mixtures;

0 to 30% by weight of a complex-forming compound from the class of the di- or tri-phosphates, aminopolycarboxylic acids and aminopolyphosphonic acids in the form of their alkali metal, ammonium or organic ammonium salts, and mixtures of the said compounds;

0 to 10% by weight of solution aids from the class of the benzene-, toluene- and xylene-sulfonates and/or urea;

0 to 2% by weight of the usual added substances from the class of optical brighteners, dyestuffs and perfumes;

20% to 80% by weight of water and/or low molecular weight alcohols;

1% to 5% by weight of a skin protective substance according to Examples 1 to 6.

The preceding specific embodiments are illustrative of the practice of the invention. It is obvious, however, that other expedients known to those skilled in the art may be employed without departing from the spirit of the invention.

I claim:
1. Washing and cleansing compositions having a content of anionic surface-active agents including at least 5% to 99% by weight of anionic surface-active agents selected from the group consisting of alkylbenzenesulfonates having 6 to 16 carbon atoms in the alkyl and olefinsulfonates, alkanesulfonates, fatty alcohol sulfates and alkylpolyglycol ether sulfates, the aliphatic hydrocarbon of which has from 8 to 22 carbon atoms and from about 1% to 60% by weight, based on the amount of said anionic surface-active agents, of a skin protective polyamide having free amino groups, said polyamide being present in a form selected from the group consisting of the water-dispersible free amino group containing polyamides and water-soluble acid addition salts thereof and being the condensation product of 1 mol of an alkanedioic, alkenedioic, hydroxyalkanedioic, cycloalkanedioic or benzenedicarboxylic acid having from 2 to 10 carbon atoms and free of other amine reacting substituents, and from 1 to 2 mols of a polyalkyleneamine of the formula $$NH_2-(C_nH_{2n}-NH)_m-C_nH_{2n}-NH_2$$

wherein $n$ represents an integer from 2 to 6 and $m$ represents an integer from 1 to 10.

2. The washing and cleansing compositions as defined in claim 1 wherein said polyamide is the condensation product of 1 mol of said dicarboxylic acid and 1 to 1.5 mols of said polyalkyleneamine.

3. The washing and cleansing compositions as defined in any one of claims 1 and 2 wherein said polyamide is present in the form of its water-soluble acid addition salt.

4. The washing and cleansing compositions as defined in any one of claims 1 and 2 wherein said polyamide is present in an amount of from 3% to 30% by weight, based on the amount of said anionic surface-active agents.

References Cited
UNITED STATES PATENTS

| | | | |
|---|---|---|---|
| 2,291,634 | 8/1942 | Katzman et al. | 252—152 |
| 2,604,451 | 7/1952 | Rocchini | 260—561 R |
| 2,878,190 | 3/1959 | Dvorkovitz et al. | 252—152 |
| 3,219,666 | 11/1965 | Norman et al. | 260—309.6 |

LEON D. ROSDOL, Primary Examiner

W. E. SCHULZ, Assistant Examiner

U.S. Cl. X.R.

252—555, 558; 424—320